United States Patent
Shabi et al.

(10) Patent No.: US 11,237,743 B2
(45) Date of Patent: Feb. 1, 2022

(54) SUB-BLOCK DEDUPLICATION USING SECTOR HASHING

(71) Applicant: EMC IP Holding Company LLC, Hopkinton, MA (US)

(72) Inventors: Uri Shabi, Tel Mond (IL); Vladimir Shveidel, Pardes-Hana (IL); Maor Rahamim, Ramla (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 249 days.

(21) Appl. No.: 16/397,131

(22) Filed: Apr. 29, 2019

(65) Prior Publication Data

US 2020/0341669 A1 Oct. 29, 2020

(51) Int. Cl.
*G06F 3/06* (2006.01)
*G06F 16/901* (2019.01)
*H04L 9/06* (2006.01)

(52) U.S. Cl.
CPC .......... *G06F 3/0641* (2013.01); *G06F 3/0608* (2013.01); *G06F 3/0644* (2013.01); *G06F 3/0673* (2013.01); *G06F 16/9017* (2019.01); *H04L 9/0643* (2013.01)

(58) Field of Classification Search
CPC .............. G06F 3/06; G06F 16/90; H04L 9/06
See application file for complete search history.

(56) References Cited

U.S. PATENT DOCUMENTS

| | | | | |
|---|---|---|---|---|
| 5,990,810 A | * | 11/1999 | Williams | G06F 3/0608 341/51 |
| 9,922,039 B1 | | 3/2018 | Armangau et al. | |
| 9,940,060 B1 | * | 4/2018 | Colgrove | G06F 3/0652 |
| 10,402,096 B2 | | 9/2019 | Sen et al. | |
| 2013/0179408 A1 | * | 7/2013 | Stoakes | G06F 16/1752 707/692 |
| 2013/0268496 A1 | * | 10/2013 | Baldwin | G06F 16/1748 707/692 |
| 2015/0370495 A1 | * | 12/2015 | Georgiev | G06F 3/0641 711/114 |
| 2017/0199891 A1 | * | 7/2017 | Aronovich | G06F 16/1748 |
| 2017/0220295 A1 | * | 8/2017 | Khan | G06F 16/1748 |

(Continued)

OTHER PUBLICATIONS

Shabi, Uri, et al.; "Delayed Deduplication Using Precalculated Hashes," U.S. Appl. No. 16/398,718, filed Apr. 30, 2019.

(Continued)

*Primary Examiner* — Pierre M Vital
*Assistant Examiner* — Vy H Ho
(74) *Attorney, Agent, or Firm* — BainwoodHuang (57) ABSTRACT

A method of performing deduplication is provided. The method includes (a) selecting, by applying a deterministic selection criterion, a sub-block of a block of data that contains multiple sub-blocks; (b) performing a lookup, into a deduplication table, of a digest generated by hashing the selected sub-block, the lookup matching an entry indexed by the digest in the deduplication table, the entry identifying a previously processed block; and (c) effecting storage of the block, including pointing to the previously processed block. An apparatus, system, and computer program product for performing a similar method are also provided.

18 Claims, 5 Drawing Sheets

(56) References Cited

U.S. PATENT DOCUMENTS

2018/0349053 A1* 12/2018 Battaje ............... G06F 12/0891
2019/0245692 A1*  8/2019 Jaroch ............... G06K 9/00577

OTHER PUBLICATIONS

Armangau, Philippe, et al.; "Deduplicating Data at Sub-Block Granularity," U.S. Appl. No. 16/176,729, filed Oct. 31, 2018.
Armangau, Philippe, et al.; "Performing Compression and Deduplication at Different Granularities," U.S. Appl. No. 16/361,338, filed Mar. 22, 2019.
Faibish, Sorin, et al.; "Elastically Managing Cache for Sub-Block Deduplication," U.S. Appl. No. 16/176,703, filed Oct. 31, 2018.
Usvyatsky, Ilya, et al.; "Techniques for De-Duplicating Data Storage Systems Using a Segmented Index," U.S. Appl. No. 15/394,376, filed Dec. 29, 2016.

* cited by examiner

SUB-BLOCK DEDUPLICATION USING SECTOR HASHING

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems support data "deduplication." A common deduplication scheme involves replacing redundant copies of a data block with pointers to a single retained copy. Such schemes may involve computing digests of data blocks and storing the digests in a database. Each digest is computed as a hash of a data block's contents and identifies the data block with a high level of uniqueness, even though the digest is typically much smaller than the data block itself. Digests thus enable block matching to proceed quickly and efficiently, without having to compare blocks byte-by-byte. For each digest, the database stores a pointer that leads to a stored version of the respective data block. To perform deduplication on a particular candidate block, a storage system computes a digest of the candidate block and searches the database for an entry that matches the computed digest. If a match is found, the storage system arranges metadata of the candidate block to point to the data block that the database has associated with the matching digest. In this manner, a duplicate copy of the data block is avoided.

SUMMARY

Unfortunately, conventional deduplication schemes fail to detect redundant data when blocks are similar but not identical or when redundant data is not aligned to block boundaries. For example, a data storage system might store multiple copies of a given block, which are identical except for a timestamp or label. Owing to the randomizing nature of the hash function, digests computed from the nearly identical copies of the data block differ widely from one another, such that deduplication is unable to detect the redundant content. Many opportunities to improve storage efficiency are therefore missed.

In contrast with prior approaches, improved techniques for performing data deduplication operate at sub-block granularity by selecting a representative sub-block from a candidate block and hashing that representative sub-block to form a digest. The techniques then involve searching a deduplication database for a match between the digest computed from the representative sub-block and a target digest stored in the database. The target digest was previously computed by hashing a target sub-block of a previously-stored target block. When a match is found, the techniques may identify a duplicate range shared between the candidate block and the target block and logically effect persistent storage of the duplicate range. In some embodiments, this is accomplished by configuring mapping metadata of the candidate block so that it points to the duplicate range in the target block.

Advantageously, the improved techniques avoid redundant storage of identical portions of data within blocks, even when the data blocks as a whole are different. Storage efficiency is thereby improved.

In one embodiment, a method of performing deduplication is provided. The method includes (a) selecting, by applying a deterministic selection criterion, a sub-block of a block of data that contains multiple sub-blocks; (b) performing a lookup, into a deduplication table, of a digest generated by hashing the selected sub-block, the lookup matching an entry indexed by the digest in the deduplication table, the entry identifying a previously processed block; and (c) effecting storage of the block, including pointing to the previously processed block. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for performing data deduplication that operate at sub-block granularity by selecting a representative sub-block from a candidate block and hashing that representative sub-block to form a digest. The techniques then involve searching a deduplication database for a match between the digest computed from the representative sub-block and a target digest stored in the database. The target digest was previously computed by hashing a target sub-block of a previously-stored target block. When a match is found, the techniques may identify a duplicate range shared between the candidate block and the target block and logically effect persistent storage of the duplicate range. In some embodiments, this is accomplished by configuring mapping metadata of the candidate block so that it points to the duplicate range in the target block.

Figure 1:
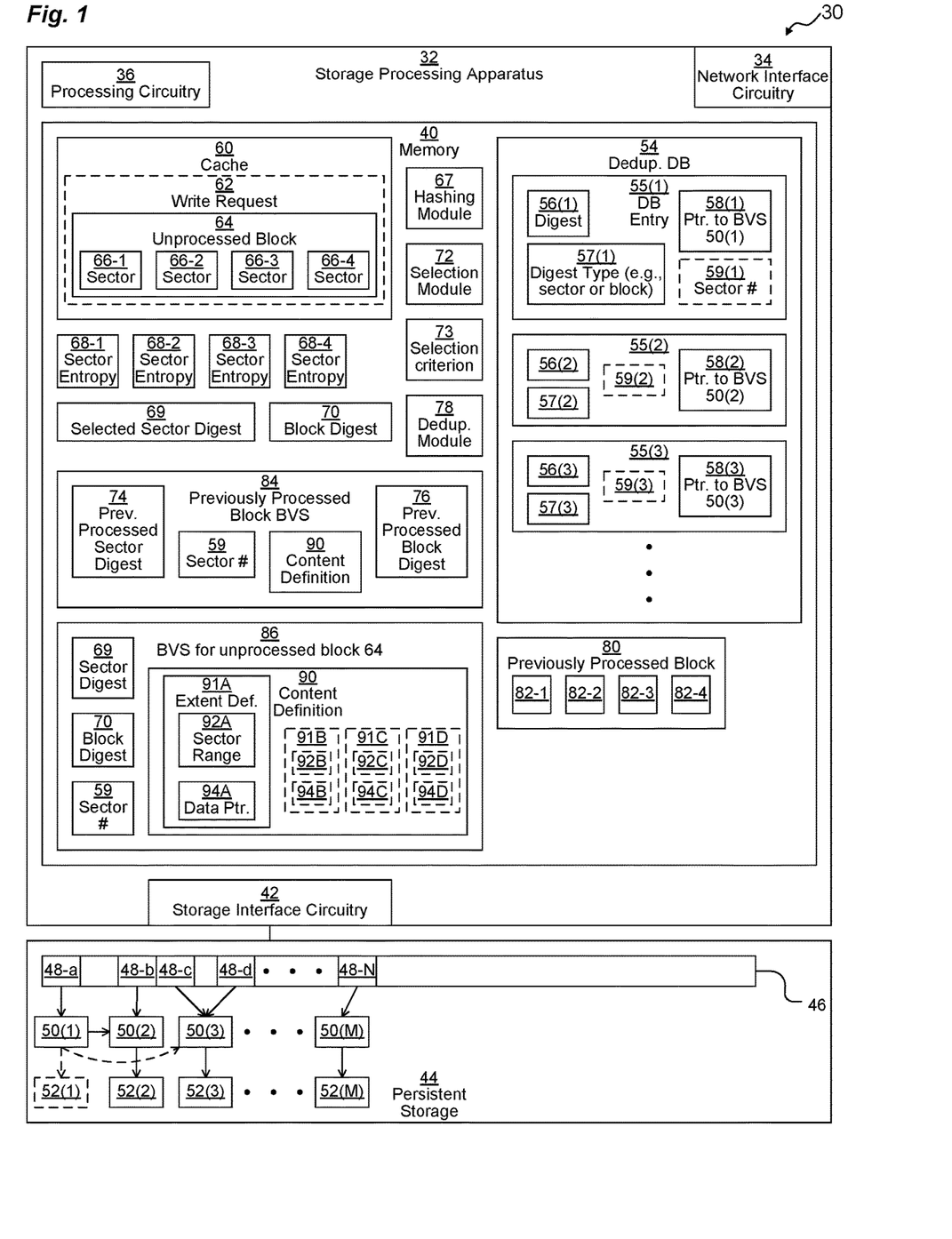
FIG. 1 is a block diagram depicting an example system and apparatus for use in connection with various embodiments.

FIG. 1 depicts an example data storage environment (DSE) 30. DSE 30 may be any kind of computing device or collection (or cluster) of computing devices, such as, for example, a personal computer, workstation, server computer, enterprise server, data storage array device, laptop computer, tablet computer, smart phone, mobile computer, etc.

DSE 30 includes at least one storage processing apparatus 32 and persistent storage 44. In some embodiments, persistent storage is shared between multiple storage processing apparatuses 32. In some embodiments, storage processing apparatus 32 may be implemented as an enclosure housing one or more circuit board assemblies or blades as well as the persistent storage 44.

Storage processing apparatus 32 includes network interface circuitry 34, processing circuitry 36, memory 40, and storage interface circuitry 42. Storage processing apparatus 32 may also include other components as are well-known in the art.

Network interface circuitry 34 may include one or more Ethernet cards, cellular modems, Fibre Channel (FC) adapters, Wireless Fidelity (Wi-Fi) wireless networking adapters, and/or other devices for connecting to a network (not depicted). Network interface circuitry 34 allows the storage processing apparatus 32 to communicate with one or more host devices (not depicted) capable of sending data storage commands to the DSE 30 over the network. In some embodiments, a host application may run directly on the storage processing apparatus 32.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Persistent storage 44 may include any kind of persistent storage devices, such as, for example, hard disk drives, solid-state storage devices (SSDs), flash drives, etc. Storage interface circuitry 42 controls and provides access to persistent storage 44. Storage interface circuitry 42 may include, for example, SCSI, SAS, ATA, SATA, FC, M.2, and/or other similar controllers and ports.

Persistent storage 44 may be logically divided into a plurality of data structures, including a logical address mapping layer 46 (including a set of mapping pointers 48 that represent logical addresses), a set of block virtualization structures (BVSes) 50 (depicted as BVSes 50(1), 50(2), 50(3), . . . , 50(M)), and a set of data extents 52 (depicted as extents 52(1), 52(2), 52(3), . . . , 52(M)). Logical address mapping layer 46 may be structured as a sparse address space that allows logical block addresses to be mapped to underlying storage. Thus, for example, one logical address is represented by mapping pointer 48-*a* that points to BVS 50(1), which points to an underlying data extent 52(1) that stores data of the block of the logical address. A block is the fundamental unit of storage at which persistent storage 44 stores data. Typically a block is 4 kilobytes or 8 kilobytes in size, although block sizes vary from system to system. In some embodiments, each data extent 52 is an actual block of the standardized size. In other embodiments, each data extent 52 may be smaller than or equal to the standard block size, if compression is used.

As depicted, two logical block addresses may share the same underlying data. Thus, logical addresses represented by mapping pointers 48-*c*, 48-*d* both point to a shared BVS 50(3), that is backed by data extent 52(3). Each BVS 50 may store a pointer to a data extent 52 as well as a digest (not depicted), which is a hash of the data of the block backed by the data extent 52. In addition, each BVS 50 may also store a reference count (not depicted) so that it can be determined how many blocks share a single data extent 52, e.g., for garbage collection purposes.

It is also possible for one BVS 50 to point to another BVS 50 with which it shares some underlying data. For example, as depicted, BVS 50(1) points to BVS 50(2) because the blocks represented by each share some data within data extent 52(2). In addition, BVS 50(1) may also point to its own data extent 52(1), which stores some data that is unique to that BVS 50 (or at least which is not shared with another BVS 52). In addition, BVS 50(1) may also point to a second BVS 50(3) with which it also shares underlying data.

In one example embodiment, a block is four kilobytes, being made up of eight 512-byte sectors. Thus, continuing with the example of BVS 50(1), data of the first seven sectors of the block represented by BVS 50(1) may be stored within data extent 52(1) (e.g., compressed and combined with other compressed data backing another block), data of the next six sectors of the block represented by BVS 50(1) may be stored within data extent 52(2) (e.g., as the last six sectors of the block represented by BVS 50(2)), and data of the last three sectors of the block represented by BVS 50(1) may be stored within data extent 52(3) (e.g., as the first three sectors of the block represented by BVS 50(3)).

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores a hashing module 67, a selection module 72 that employs at least one selection criterion 73, a deduplication module 78, and other software modules which each execute on processing circuitry 36 to fulfill data storage requests (e.g., write requests 62) which are either received from hosts or locally-generated.

Memory 40 also stores a cache portion 60 for temporarily storing data storage requests (e.g., write requests 62), a deduplication database (DB) 54, and various other supporting data structures. Memory 40 may also store various other data structures used by the OS, I/O stack, hashing module 67, selection module 72, deduplication module 78, and various other applications (not depicted).

Cache 60 stores one or more unprocessed blocks 64, which are blocks of data that have not yet been fully processed for deduplication purposes.

In some examples, an unprocessed block 64 may be a newly-received block of data as part of a write request 62 directing the storage processing apparatus 32 to store the data on persistent storage 44 as part of a logical disk represented by logical address mapping layer 46. In these examples, deduplication may be performed inline, prior to or simultaneously with storing the data on persistent storage 44. In other examples, an unprocessed block 64 may be a block already stored in persistent storage without regard to deduplication. For example, a block of data logically located at a logical address represented by mapping pointer 48-*a* that points to mapping pointer 50(1) may initially be stored entirely within extent 52(1) even though some of its data overlaps with data of blocks located at logical addresses represented by mapping pointer 48-*b* and 48-*c*. In these examples, deduplication may be performed in the background. Thus, deduplication module 78 may load unprocessed blocks 64 into memory from persistent storage 44 to be deduplicated as system resources permit.

Deduplication DB 54 (which may be any type of table, e.g., arranged as a key-value store) stores a set of entries 55, each of which maps a digest 56 to an indication of location of data. For example, the indication of location of data may be a pointer 58 that points to a particular BVS 50. This allows the storage processing apparatus 32 (hereinafter "device" 32) to determine whether all or a portion of the data of an unprocessed block 64 is already stored in another block of persistent storage 44 that has already been processed for deduplication, and which BVS 50 (and ultimately, which underlying data extent 52) it is associated with. It should be understood that the digests 56 may or may not be stored within each entry 55. In some embodiments, the digests 56 may instead be used as an index into the entries 55, defining their location. In some embodiments, a prefix of each digest 56 may define its location, and the remainder of the digest 56 may be stored within its entry 55.

Each entry 55 also includes a type indication 57 that identifies whether the digest 56 of that entry 55 is a hash of a sector or a hash of an entire block. If the type indication 57 indicates a sector hash, then entry 55 also includes a sector number 59 that identifies which sector of the block is the one which was hashed to produce the digest 56.

In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or persistent storage 44 is configured to store programs and data even while device 32 is powered off. The OS, applications, hashing module 67, selection module 72, selection criterion 73, and deduplication module 78 are typically stored in this persistent storage portion of memory 40 or on persistent storage 44 so that they may be loaded into a system portion of memory 40 upon a system restart or as needed. The hashing module 67, selection module 72, and deduplication module 78, when stored in non-transitory form either in the volatile portion of memory 40 or on persistent storage drives 44 or in persistent portion of memory 40, each form a computer program product. The processing circuitry 36 running one or more applications thus forms a specialized circuit constructed and arranged to carry out the various processes described herein.

In operation, upon beginning to process an unprocessed block 64 for deduplication, selection module 72 operates to choose a particular one of the sectors 66 (depicted as sectors 66-1, 66-2, 66-3, 66-4) of the unprocessed block 64 to represent that unprocessed block 64. Although four sectors 66 are depicted, that is for illustrative simplification only. There may be any number of sectors 66 in an unprocessed block 64, depending on the embodiment. In one example embodiment, there are eight 512-byte sectors 66 in an unprocessed block 64 of size four kilobytes. In another example embodiment, there are sixteen 512-byte sectors 66 in an unprocessed block 64 of size eight kilobytes.

Selection module 72 applies at least one deterministic selection criterion 73 so that given two unprocessed blocks 64 with identical contents, selection module 72 always selects the same sector 66. In one example embodiment, selection criterion 73 may involve selecting the sector 66 with the highest entropy value 68. For example, selection module 72 may calculate an entropy value 68 (depicted as sector entropy values 68-1, 68-2, 68-3, 68-4) for each sector 66, and choose the sector 66 having the highest entropy value 68 of any of the sectors 66. A tie-breaking mechanism may be employed if there is more than one sector 66 with the same highest entropy (e.g., the first such sector 66 is chosen).

Once the selection module 72 selects the particular sector 66 to represent the unprocessed block 64, hashing module 67 operates to hash that selected sector 66 to generate the selected sector digest 69. Hashing module 67 applies a hashing algorithm such as, for example, SHA-0, SHA-1, SHA-2, SHA-3, or MD5. Such algorithms may provide bit-depths such as 128 bits, 160 bits, 172 bits, 224 bits, 256 bits, 384 bits, and 512 bits, for example. Preferably an advanced hashing algorithm with a high bit-depth (i.e., 160 bits or higher) is used to ensure a low probability of hash collisions between different blocks. If a lower bit-depth is used, then the contents of blocks must be compared to ensure that there isn't a hash collision. Hashing module 67 also operates to hash the entire unprocessed block 64 to generate block digest 70.

Deduplication module 78 then looks up the selected sector digest 69 in the deduplication DB 54. If an entry 55 with a matching digest 56 is found, then deduplication module 78 loads the BVS 50 pointed to by the BVS pointer 58 of that entry 55 into memory 40 as previously processed block (PPB) BVS 84 (unless it is already cached). PPB BVS 84 represents a PPB 80, which was previously processed by deduplication module 78.

Deduplication module 78 may compare the sector number 59 of the PPB BVS 84 to the sector number of the selected sector digest 69. If the two sector numbers do not match, then the PPB 80 is known to be different than the unprocessed block 64. It is also known (assuming that a hashing algorithm at least as strong as SHA-1 is used) that at least one sector 66 of unprocessed block 64 is common with at least one sector 82 of PPB 68. If the two sector numbers do match, then deduplication module 78 may compare the block digest 70 of the unprocessed block 64 with the previously processed block digest 76 of the PPB 80, as read from PPB BVS 84. In some embodiments, if block digests 70 and 76 match, then the contents of unprocessed block 64 may be assumed to be the same as the contents of PPB 80, and the unprocessed block 84 may be deduplicated on a block level. In other embodiments (e.g., if a hashing algorithm weaker than SHA-1 is used), further checking may be needed to verify that the contents actually match. If the block digests 70 and 76 do not match, then PPB 80 is, at best, only a partial match for unprocessed block 64. In embodiments in which a weak hashing algorithm is used, then the existence of at least a partial match can be verified by loading the contents of PPB 80 and comparing the contents of the PPB sector 82 with the sector number 59 as defined by the PPB BVS 84 against the contents of the sector 66 with the sector number of the selected sector digest 69.

If PPB 80 is only a partial match for unprocessed block 64, then deduplication module 78 loads contents of PPB 80, including its sectors 82 (depicted as sectors 82-1, 82-2, 82-3, 82-4) from persistent storage 44 (unless already cached). The various sectors 82 of PPB 80 may be located by referring to the content definition 90 within the PPB BVS 84. Deduplication module 78 compares the PPB sectors 82 with the sectors 66 of unprocessed block 64. Because it is already known that a particular sector 66 of unprocessed block 64 corresponds to a particular sector 82 of PPB 80, comparing sectors 66, 82 in an outwards manner from those particular sectors 66, 82 is sufficient. See below in connection with FIGS. 4A-4B.

If sectors 82 of PPB 80 match up to an edge of PPB 80 (i.e., a first or last sector 82 in PPB 80), it may be helpful to load another block adjacent to the PPB 80 within logical address space 46 and to perform further comparisons against sectors of that block. See below in connection with FIGS. 5A-5B.

Once these comparisons have been done, one or more sectors 66 of unprocessed block 64 will be found to correspond to previously stored sectors 82 of PPB 80 (and possibly a neighboring block). These correspondences can then be used to deduplicate unprocessed block 64 by modifying the content definition 90 of its BVS 86. For example, between one and four extent descriptors 91 (depicted as extent descriptors 91A, 91B, 91C, 91D) may be stored in the content definition 90 of the BVS 86 for the unprocessed block 64. Each extent descriptor 91 includes a sector range 92 and a pointer 94. Sector range 92 defines which sectors 66 of unprocessed block 64 are covered by the extent descriptor 91, and pointer 94 points to a location of where its contents may be found in persistent storage 44 (i.e., within a data extent 52). There may be up to four extent descriptors 91A, 91B, 91C, 91D because there may be unique data at the beginning and/or the end of the unprocessed block 64, each of which gets its own extent descriptor 91, and there may also be an extent within PPB 80 and possibly also within a neighboring block, each of which also gets its own extent descriptor 91.

If unprocessed block 64 does not match any PPB 80 in its entirety, then a new entry 55 for the unprocessed block 64 may be inserted into the deduplication DB 55. The new entry 55 will be indexed by the selected sector digest 69 unless that selected sector digest 69 is already within the deduplication DB 55, in which case the block digest 70 may be used instead.

Figure 2:
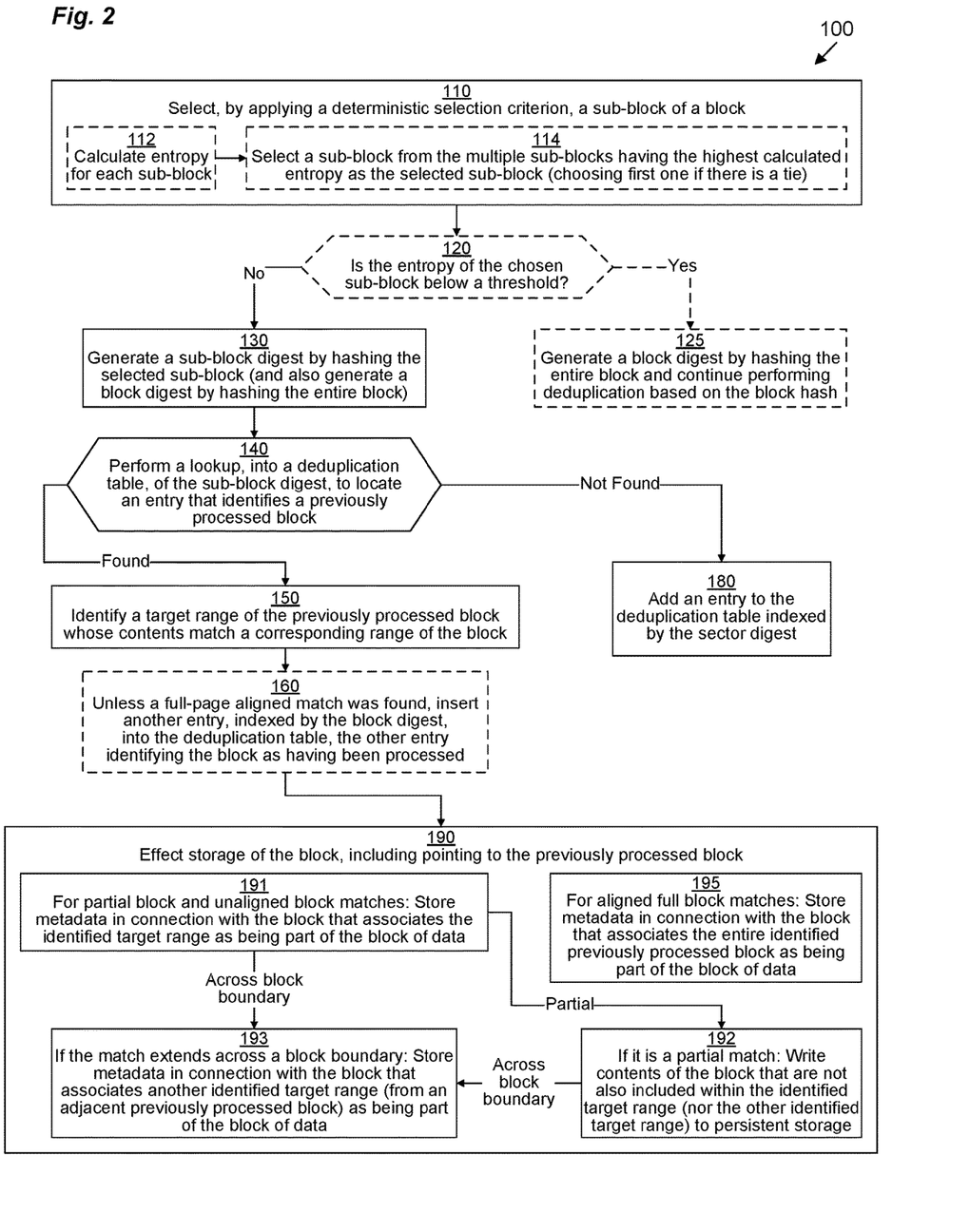
FIG. 2 is a flowchart depicting example methods of various embodiments.

FIG. 2 illustrates an example method 100 performed by device 32 for performing deduplication of unprocessed blocks 64 in accordance with various embodiments. It should be understood that any time a piece of software (e.g, I/O stack, hashing module 67, selection module 72, or deduplication module 78) is described as performing a method, process, step, or function, what is meant is that a computing device (e.g., device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order.

In step 110, selection module 72 selects, by applying at least one deterministic selection criterion 73, a sub-block (e.g., a sector 66) of an as-yet unprocessed block 64. Although in some embodiments, a sub-block may be a standard 512-byte sector, this is by way of example only. In other embodiments, unprocessed block 64 may be divided into any number of sub-blocks, provided that the size of a sub-block is kept constant and provided that the sub-blocks do not overlap and that they combine to cover the entire unprocessed block 64. For convenience of presentation, a sub-block will be referred to as a "sector" for the remainder of this Description.

Any kind of deterministic selection criterion 73 may be used, as long as for all unprocessed blocks 64 that share the exact same contents, the selection of which sector 66 represents it is the same. In some embodiments, the selection criterion 73 selects the sector 66 with the highest entropy 68. In these embodiments, step 110 may include two sub-steps 112, 114.

In sub-step 112, selection module 72 calculates an entropy 68 for each sector 66. Then, in sub-step 114, selection module 72 selects the sector 66 which has the highest calculated entropy 68 among the set of calculated entropies 68 for the unprocessed block 64 as the selected sector 66. Selection module 72 may also apply a tie-breaking criterion (e.g., if there are several sectors 66 whose entropies 68 are tied for the highest value, then the first such sector 66 reading from left-to-right may be chosen in one example, or the second such sector 66 may be chosen, or the last such sector 66 may be chosen, etc.).

In some embodiments, deterministic selection criterion 73 may be some other kind of criterion. For example, it could include always selecting a sector 66 in a particular position, such as the second sector 66-2 or the last sector 66-8, etc.

In some embodiments, after step 110, operation may proceed with optional step 120, but, in other embodiments, operation proceeds directly with step 130.

In step 120, selection module 72 determines whether the entropy 68 of the selected sector 66 is below a predetermined threshold value, in which case operation proceeds with step 125, in which standard deduplication techniques may be applied using the block digest 70 rather than the sector digest 69. This check prevents certain common sectors 66 (e.g., all zeroes, all ones, etc.) from serving as the basis for deduplication, which could lead to many false positives. Step 125 may include first searching the deduplication table 54 for a matching block digest 70 and adding a new entry 55 to the deduplication table 54 indexed by the block digest 70 if no match is found. If step 120 has a negative result, then operation proceeds with step 130.

In step 130, hashing module 67 generates the selected sector digest 69 by hashing the selected sector 66. In some embodiments, hashing module 67 also generates the block digest 70 at this point by hashing the entire unprocessed block 64.

In step 140, deduplication module 78 performs a lookup, into the deduplication table (or DB) 54, of the sector digest 69. If it finds an entry 55 indexed by the sector digest 69, then (assuming that a hashing algorithm at least as strong as SHA-1 is used; if not, additional checks may be needed, but these are omitted from FIG. 2 and its description) that entry 55 identifies a previously processed block 80, so operation can proceed with step 150, detailed below; otherwise, operation proceeds with step 180. Step 140 may be accomplished by searching the deduplication DB 54 for an entry 55 whose digest 56 is equal to the sector digest 69. If such an entry 55 is found, then the pointer 58 from that entry 55 may be used to locate (and load, if not already in memory) the PPB BVS 84.

In step 180, deduplication module 78 adds a new entry 55 to the deduplication DB 54 that is indexed by the sector hash 69. The new entry 55 also includes a pointer 58 to the BVS 86 for the unprocessed block 64, whose content definition 90 includes a single extent definition 91A whose data pointer 94A points to a data extent 52 in persistent storage 44 that stores the entire contents of the unprocessed block 64 (whether compressed or uncompressed). The sector range 92A indicates that the extent definition 91A covers all sectors 66 of the unprocessed block 64.

Returning to step 150, in step 150, deduplication module 78 identifies a target range of the previously processed block 80 whose contents match a corresponding range of the unprocessed block 64.

Figure 3:
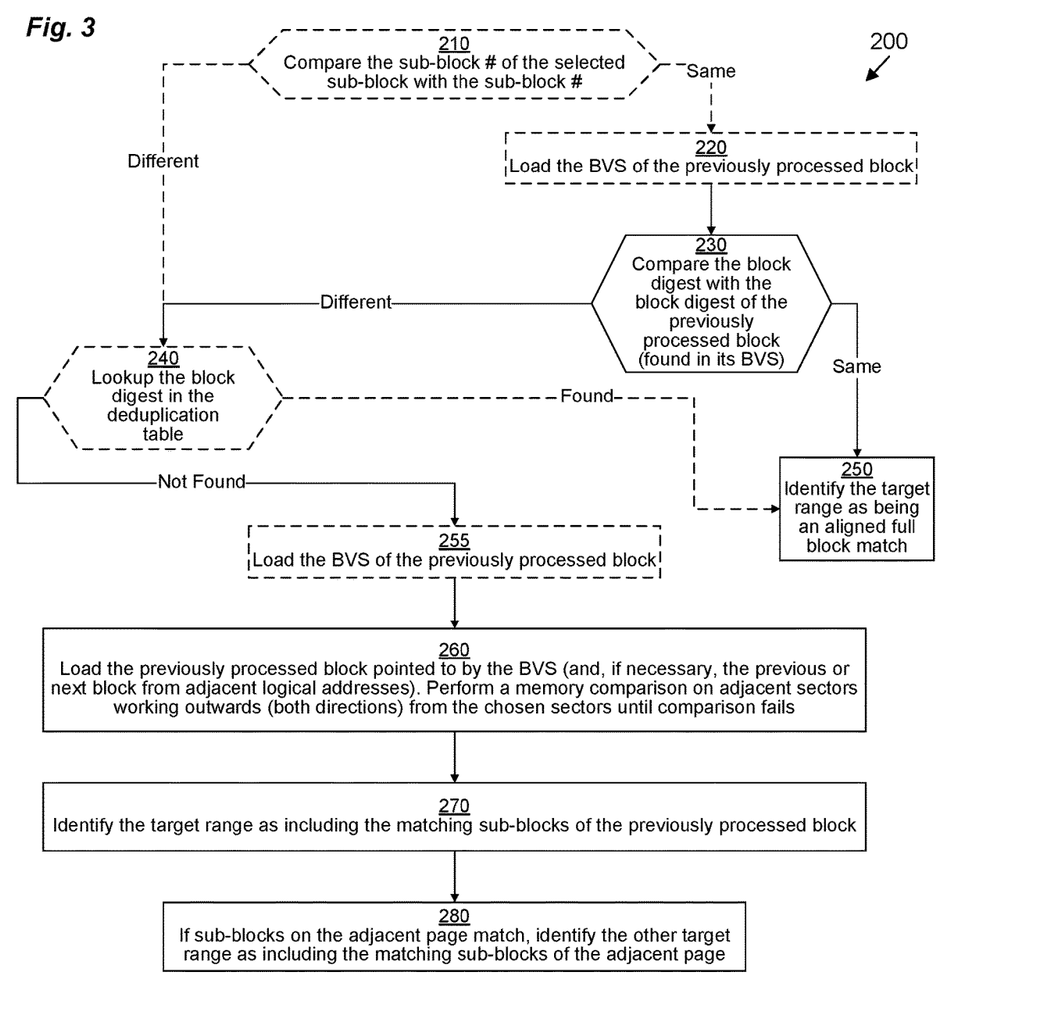
FIG. 3 is a flowchart depicting example methods of various embodiments.

FIG. 3 illustrates an example method 200 performed by device 32 for performing step 150 in accordance with various embodiments. It should be understood that one or more of the steps or sub-steps of method 200 may be omitted in some embodiments. Similarly, in some embodiments, one or more steps or sub-steps may be combined together or performed in a different order.

In step 210, in some embodiments, deduplication module 78 compares the sector number of the selected sector 66 from the unprocessed block 64 with the sector number 59 (which is found in the entry 55 in the deduplication DB 54 that was located in step 140 of method 100) of the PPB 80. If they match, then it is possible that the unprocessed block 64 is identical to PPB 80, so operation proceeds with step 230 to determine whether that is the case or not. But, first, in step 220, deduplication module 78 loads the PPB BVS 84 (which was pointed to by pointer 58 from the entry 55 in the deduplication DB 54 that was located in step 140 of method 100) if it is not already in memory 40. Then, in step 230, deduplication module 78 compares the block digest 70 of the unprocessed block 64 with the block digest 76 of the previously processed block 76, which it obtains from the PPB BVS 84. If they match, then, in step 250, deduplication module 78 may identify the target range as the entire PPB 80. This corresponds to an aligned full-block match.

If either step 210 or step 230 yields a difference as its result, then operation may proceed with step 240. In step 240, deduplication module 78 looks up the block digest 70 of the unprocessed block 64 in the deduplication DB 54. This is useful because even though we know that there is a partial deduplication match with one PPB 80, it is possible that another PPB 80 is an aligned full-block match, and that would result in more efficient deduplication. If the lookup of step 240 succeeds, then operation proceeds with step 250, in which deduplication module 78 may identify the target range as the entire newly-found PPB 80. This corresponds to an aligned full-block match.

It should be understood that performing step 210 is an optimization because it allows ruling out an aligned full-block match with the PPB 80 identified by the entry 55 found in step 140 without having to load the PPB BVS 84. Although the PPB BVS 84 may eventually need to be loaded in step 255, it can be avoided if step 240 proceeds directly with step 250.

If step 240 is skipped, operation may proceed directly with step 240. In step 240, deduplication module 78 loads the PPB BVS 84 (which was pointed to by pointer 58 from the entry 55 in the deduplication DB 54 that was located in step 140 of method 100) if it is not already in memory 40 (e.g., if it was not already loaded in step 220). Then operation proceeds with step 260.

In step 260, deduplication module 78 loads the PPB 80 pointed to by the PPB BVS 84 (from the data pointer 94A of its content definition 90) into memory 40. Deduplication module 78 then compares various sectors 66 of the unprocessed block 64 with potentially corresponding sectors 82 of the PPB 80, working outwards from the selected sector 66. This can be illustrated in connection with FIGS. 4A-4B. In the examples depicted in FIGS. 4A-4B, there are eight sectors 66, 82 per block.

Figure 4A:
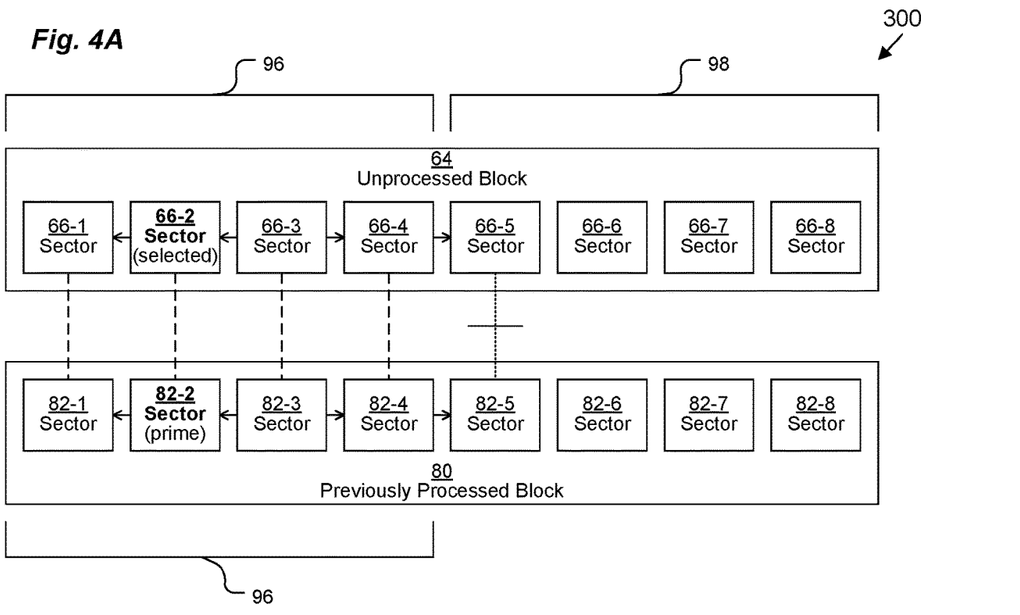
FIGS. 4A-4B are block diagrams depicting example data structures processed according to various embodiments.

FIG. 4A illustrates an example partial block match arrangement 300. In the example of arrangement 300, the selected sector number within unprocessed block 64 matches the sector number 59 of the PPB 80 (i.e., there was a positive match in step 210). Thus, as depicted, the selected sector number is 2, so selected sector 66-2 corresponds to "prime" sector 82-2 ("prime" referring to the sector 82 of the previously processed block 80 that corresponds to the selected sector 66 of the unprocessed block 64). In some embodiments, if the hashing algorithm is weaker than SHA-1, then the contents of the prime sector 82-2 are first compared to the selected sector 66-2. If they do not match, then there was a hash collision, and the entire match is false. Otherwise, the match is known to be good. Then the sectors 66 of unprocessed block 64 are examined working outwards from sector 66-2 in each direction until a mismatch is found. Thus, if we start by moving to the left, sector 66-1 is compared to sector 82-1. This comparison may be a memory compare operation to confirm that the contents of the two sectors 66-1, 82-1 are identical. As depicted, they are identical, so sector 82-1 is considered part of the target range 96 of the PPB 80 (which is equivalent to saying that sector 66-1 is part of target range 96). Since sector 66-1 is at the edge of unprocessed block 64, there is no further sector 66 to move on to to the left, so we may begin working rightwards from sector 66-2. Thus, sector 66-3 is compared to sector 82-3. As depicted, they are identical, so sector 82-3 is considered part of the target range 96 of the PPB 80 (which is equivalent to saying that sector 66-3 is part of target range 96). Moving rightwards again, sector 66-4 is compared to sector 82-4. As depicted, they are identical, so sector 82-4 is considered part of the target range 96 of the PPB 80 (which is equivalent to saying that sector 66-4 is part of target range 96). Moving rightwards again, sector 66-5 is compared to sector 82-5. As depicted, they do not match, so there is no need to examine sectors 66-6, 66-7, 66-8. Sectors 66-5, 66-6, 66-7, 66-8 make up a unique range 98 of unprocessed block 64.

Figure 4B:
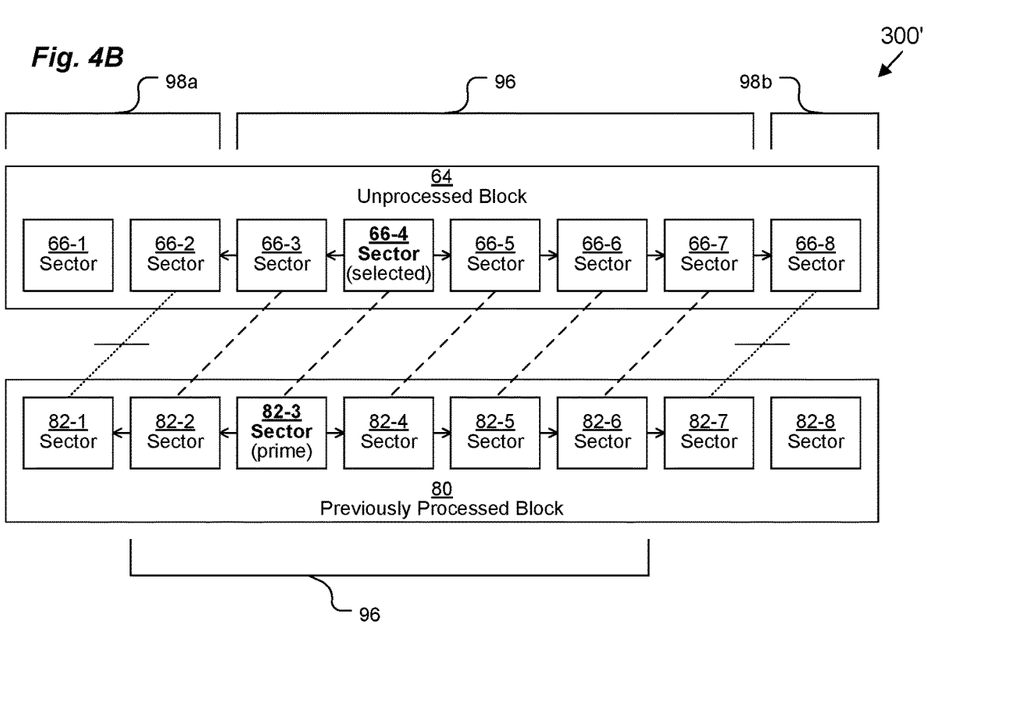

FIG. 4B illustrates another example partial block match arrangement 300'. In the example of arrangement 300', the selected sector number within unprocessed block 64 is different than the sector number 59 of the PPB 80 (i.e., there was a negative result in step 210). Thus, as depicted, the selected sector number within unprocessed block 64 is 4, and the sector number 59 is 3, so selected sector 66-4 corresponds to prime sector 82-3. Then the sectors 66 of unprocessed block 64 are examined working outwards from sector 66-4 in each direction until a mismatch is found. Thus, if we start by moving to the left, sector 66-3 is compared to sector 82-2. As depicted, they are identical, so sector 82-2 is considered part of the target range 96 of the PPB 80 (which is equivalent to saying that sector 66-3 is part of target range 96). Moving leftwards again, sector 66-2 is compared to sector 82-1. As depicted, they do not match, so there is no need to examine sector 66-1, and we may begin working rightwards from sector 66-4. Thus, sector 66-5 is compared to sector 82-4. As depicted, they are identical, so sector 82-4 is considered part of the target range 96 of the PPB 80 (which is equivalent to saying that sector 66-5 is part of target range 96). Moving rightwards again, sector 66-6 is compared to sector 82-5. As depicted, they are identical, so sector 82-5 is considered part of the target range 96 of the PPB 80 (which is equivalent to saying that sector 66-6 is part of target range 96). Moving rightwards again, sector 66-7 is compared to sector 82-6. As depicted, they are identical, so sector 82-6 is considered part of the target range 96 of the PPB 80 (which is equivalent to saying that sector 66-7 is part of target range 96). Moving rightwards again, sector 66-8 is compared to sector 82-7. As depicted, they do not match, so the comparisons end. Sectors 66-1, 66-2, make up a first unique range 98a of unprocessed block 64, and sector 66-6 makes up a second unique range 98b of unprocessed block 64.

Returning to FIG. 3, in some embodiments and situations, step 260 also includes loading an additional block that is adjacent to the PPB 80 within logical address mapping layer 46 and comparing various sectors 66 of the unprocessed block 64 with potentially corresponding sectors of that adjacent block. This can be illustrated in connection with FIGS. 5A-5B. In the examples depicted in FIGS. 5A-5B, there are six sectors 66 per block.

Figure 5A:
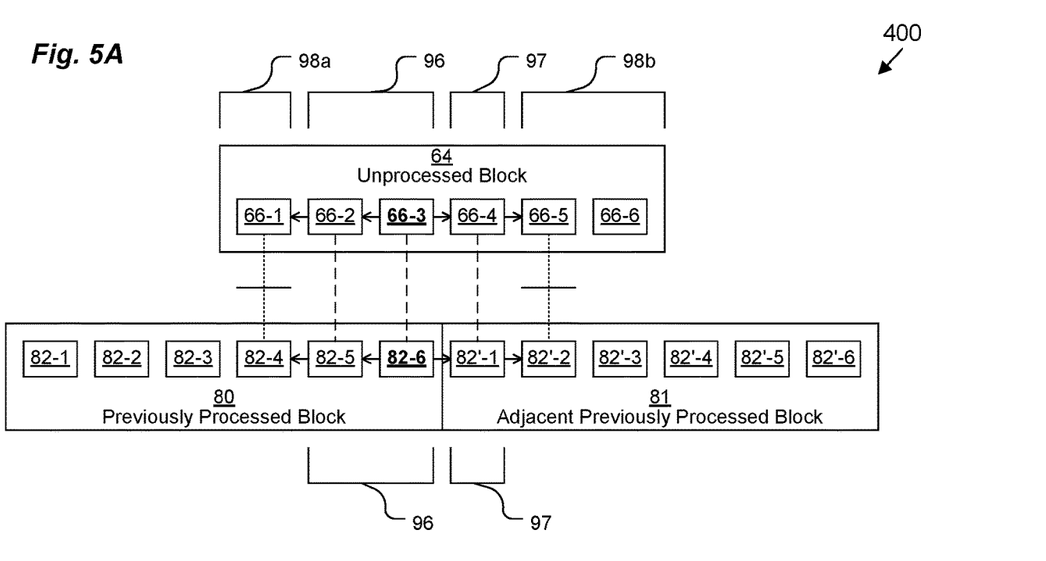
FIGS. 5A-5B are block diagrams depicting example data structures processed according to various embodiments.

FIG. 5A illustrates an example extended unaligned block match arrangement 400. In the example of arrangement 400, the selected sector number within unprocessed block 64 is different than the sector number 59 of the PPB 80 (i.e., there was a negative result in step 210). Thus, as depicted, the selected sector number within unprocessed block 64 is 3, and the sector number 59 is 6, so selected sector 66-3 corresponds to prime sector 82-6. Then the sectors 66 of unprocessed block 64 are examined working outwards from sector 66-3 in each direction until a mismatch is found. Thus, if we start by moving to the left, sector 66-2 is compared to sector 82-5. As depicted, they are identical, so sector 82-5 is considered part of the target range 96 of the PPB 80 (which is equivalent to saying that sector 66-2 is part of target range 96). Moving leftwards again, sector 66-1 is compared to sector 82-4. As depicted, they do not match, so the comparisons end in this direction, and we may begin working rightwards from sector 66-3. However, there are no more sectors 82 left in PPB 80 to the right of sector 82-6, so adjacent previously processed block 81 is loaded into memory 40. This adjacent previously processed block 81 is logically-positioned immediately after PPB 80 within logical address mapping layer 46. Then, sector 66-4 is compared to sector 82'-1 of adjacent previously processed block 81. As depicted, they are identical, so sector 82'-1 is considered part of another target range 97 of the adjacent previously processed block 81 (which is equivalent to saying that sector 66-4 is part of the other target range 97). Moving rightwards again, sector 66-5 is compared to sector 82'-2. As depicted, they do not match, so there is no need to examine sector 66-6. Sector 66-1 makes up a first unique range 98a of unprocessed block 64, and sectors 66-5, 66-6 makes up a second unique range 98b of unprocessed block 64.

Figure 5B:
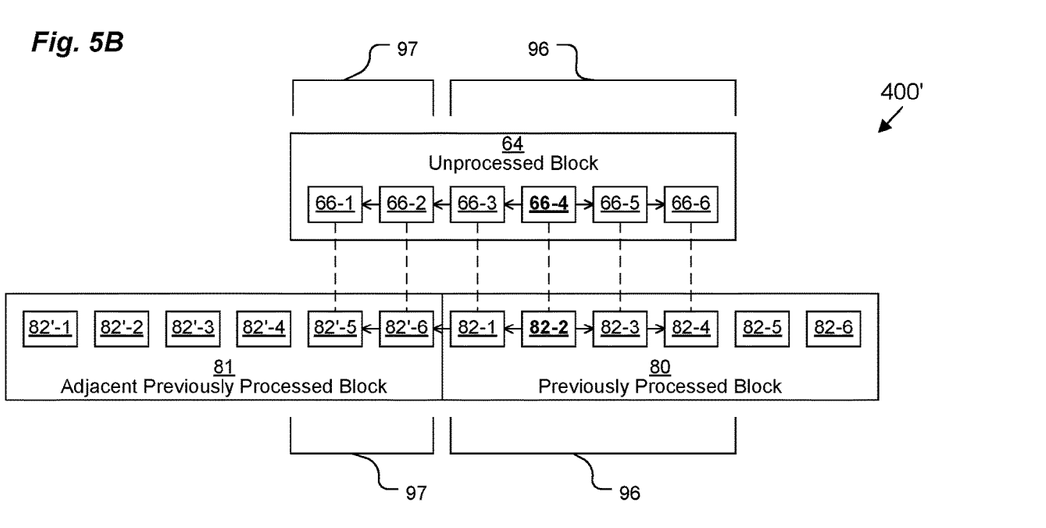

FIG. 5B illustrates another extended unaligned block match arrangement 400'. In the example of arrangement 400', the selected sector number within unprocessed block 64 is different than the sector number 59 of the PPB 80 (i.e., there was a negative result in step 210). Thus, as depicted, the selected sector number within unprocessed block 64 is 4, and the sector number 59 is 2, so selected sector 66-4 corresponds to prime sector 82-2. Then the sectors 66 of unprocessed block 64 are examined working outwards from sector 66-4 in each direction until a mismatch is found. Thus, if we start by moving to the right, sector 66-5 is compared to sector 82-3. As depicted, they are identical, so sector 82-3 is considered part of the target range 96 of the PPB 80 (which is equivalent to saying that sector 66-5 is part of target range 96). Moving rightwards again, sector 66-6 is compared to sector 82-4. As depicted, they are identical, so sector 82-4 is considered part of the target range 96 of the PPB 80 (which is equivalent to saying that sector 66-6 is part of target range 96). Since sector 66-6 is at the edge of unprocessed block 64, there is no further sector 66 to move on to to the right, so we may begin working leftwards from sector 66-4. Thus, sector 66-3 is compared to sector 82-1. As depicted, they are identical, so sector 82-1 is considered part of the target range 96 of the PPB 80 (which is equivalent to saying that sector 66-3 is part of target range 96). Moving leftwards again, there are no more sectors 82 left in PPB 80 to the left of sector 82-1, so adjacent previously processed block 81 is loaded into memory 40. This adjacent previously processed block 81 is logically-positioned immediately before PPB 80 within logical address mapping layer 46. Then, sector 66-2 is compared to sector 82'-6. As depicted, they are identical, so sector 82'-6 is considered part of other target range 97 of the adjacent previously processed block 81 (which is equivalent to saying that sector 66-2 is part of other target range 97). Moving leftwards again, sector 66-1 is compared to sector 82'-5. As depicted, they are identical, so sector 82'-5 is considered part of other target range 97 of the adjacent previously processed block 81 (which is equivalent to saying that sector 66-1 is part of other target range 97). Since sector 66-1 is at the edge of unprocessed block 64, there is no further sector 66 to move on to to the left, so comparisons end. There are no unique ranges within unprocessed block 64, so arrangement 400' actually represents an unaligned full-block match.

Returning to FIG. 3, step 270 follows step 260. In step 270, deduplication module 78 identifies the target range 97 of the PPB 80 as including the matching sectors 82 of the PPB 80. Thus, in the example of FIG. 4A, target range 96 is identified as being made up of sectors 82-1, 82-2, 82-3, 82-4 (or, equivalently, sectors 66-1, 66-2, 66-3, 66-4). In the example of FIG. 4B, target range 96 is identified as being made up of sectors 82-2, 82-3, 82-4, 82-5, 82-6 (or, equivalently, sectors 66-3, 66-4, 66-5, 66-6, 66-7). In the example of FIG. 5A, target range 96 is identified as being made up of sectors 82-5, 82-6 (or, equivalently, sectors 66-2, 66-3). In the example of FIG. 5B, target range 96 is identified as being made up of sectors 82-1, 82-2, 82-3, 82-4 (or, equivalently, sectors 66-3, 66-4, 66-5, 66-6).

Then, in step 280, if sectors 82' on an adjacent previously processed block 81 match sectors of the unprocessed block 64, then deduplication module 78 identifies the other target range 97 of the adjacent previously processed block 81 as including the matching sectors 82' of the adjacent previously processed block 81. Thus, in the example of FIG. 5A, other target range 97 is identified as being made up of sector 82'-1 (or, equivalently, sector 66-4). In the example of FIG. 5B, other target range 97 is identified as being made up of sectors 82'-5, 82'6 (or, equivalently, sectors 66-1, 66-2).

Returning to FIG. 2, once the target range 96 (and the other target range 97, if applicable) have been identified in step 150, operation proceeds with step 160. In step 160, in some embodiments, unless an aligned full-block match was found (i.e., step 250 was performed) deduplication module 78 inserts another entry 55, indexed by the block digest 70 of the unprocessed block 64, into the deduplication DB 54, the other entry 55 identifying the unprocessed block 64 as having now become processed (or about to be, once step 190 is completed). The new entry 55 includes a pointer 58 to BVS 86, but since it is indexed by block hash 70, the sector number 59 is omitted, and the digest type 57 indicates that it is block digest based.

Then, in step 190, deduplication module 78 effects storage of the unprocessed block 64, including pointing to the PPB 80 (via its BVS 84). Step 190 may be effected by performing various sub-steps.

If unprocessed block 64 has a partial-block or unaligned full-block match, then, in sub-step 191, deduplication module 78 stores metadata in connection with the unprocessed block 64 that associates the identified target range 96 as being part of the unprocessed block 64. In some embodiments, this includes storing an indication of the sector positions of the target range 96 within the unprocessed block 64 as the sector range 92 of one extent definition 91 of BVS 86, as well as storing a pointer to the first (i.e., leftmost) sector 82 of target range 96 within PPB 80 as the data pointer 94 of that extent definition 91.

If unprocessed block 64 has a partial-block match, then, in sub-step 192, deduplication module 78 writes contents of the unique range 98 (or ranges 98a, 98b) to persistent storage 44 and it stores metadata in connection with the unprocessed block 64 pointing to the unique range(s) 98. In some embodiments, this includes placing the data of each unique range 98 in a data extent 52 (possibly compressed together with other data) and storing an indication of the sector positions of each unique range 98 within the unprocessed block 64 as the sector range 92 of one extent definition 91 of BVS 86, as well as storing a pointer to the first (i.e., leftmost) sector 66 of each unique range 98 within the data extent 52 as the data pointer 94 of that extent definition 91.

If unprocessed block 64 has an extended match that extends into an adjacent previously processed block 81, then, in sub-step 193, deduplication module 78 stores metadata in connection with the unprocessed block 64 that associates the other identified target range 97 (from the adjacent previously processed block 81) as being part of the unprocessed block 64. In some embodiments, this includes storing an indication of the sector positions of the other target range 97 within the unprocessed block 64 as the sector range 92 of one extent definition 91 of BVS 86, as well as storing a pointer to the first (i.e., leftmost) sector 82' of other target range 97 within adjacent previously processed block 81 as the data pointer 94 of that extent definition 91.

If the unprocessed block 64 has an aligned full-block match, then, in sub-step 195, deduplication module 78 stores metadata in connection with the unprocessed block 64 that associates the entire identified PPB 80 as being part of unprocessed block 64. In some embodiments, this includes storing exactly one extent definition 91A within the content definition 90 of BVS 86. Sector range 92A is set to indicate all of the sectors 66 are included within the range, and data pointer 94 is set to point to the PPB BVS 84.

Thus, for example, in the example of FIG. 4A, step 190 includes storing two extent definitions 91A, 91B within BVS 86. Extent definition 91A has sector range 92A indicating sector numbers 1-4 and data pointer 94A pointing to the beginning of PPB BVS 84 (offset zero). Extent definition 91B has sector range 92B indicating sector numbers 5-8 and data pointer 94A pointing to sector 66-5 as newly-stored in a data extent 52 of persistent storage 44.

In addition, in the example of FIG. 4B, step 190 includes storing three extent definitions 91A, 91B, 91C within BVS 86. Extent definition 91A has sector range 92A indicating sector numbers 1-2 and data pointer 94A pointing to sector 66-1 as newly-stored in a data extent 52 of persistent storage 44. Extent definition 91B has sector range 92B indicating sector numbers 3-7 and data pointer 94B pointing to offset 2 of PPB BVS 84. Extent definition 91C has sector range 92C indicating sector number 8 and data pointer 94C pointing to sector 66-8 as newly-stored in a data extent 52 of persistent storage 44.

In addition, in the example of FIG. 5A, step 190 includes storing four extent definitions 91A, 91B, 91C, 91D within BVS 86. Extent definition 91A has sector range 92A indicating sector number 1 and data pointer 94A pointing to sector 66-1 as newly-stored in a data extent 52 of persistent storage 44. Extent definition 91B has sector range 92B indicating sector numbers 2-3 and data pointer 94B pointing to offset 5 of PPB BVS 84. Extent definition 91C has sector range 92C indicating sector number 4 and data pointer 94C pointing to the beginning of a BVS 50 for the adjacent previously processed block 81 (offset zero). Extent definition 91D has sector range 92D indicating sector numbers 5-6 and data pointer 94D pointing to sector 66-5 as newly-stored in a data extent 52 of persistent storage 44.

In addition, in the example of FIG. 5B, step 190 includes storing two extent definitions 91A, 91B within BVS 86. Extent definition 91A has sector range 92A indicating sector numbers 1-2 and data pointer 94A pointing to offset 5 of a BVS 50 for the adjacent previously processed block 81 (offset zero). Extent definition 91B has sector range 92B indicating sector numbers 3-6 and data pointer 94B pointing to the beginning of PPB BVS 84 (offset zero).

Thus, techniques have been presented for performing data deduplication that operate at sub-block granularity by selecting a representative sub-block (e.g., sector 66) from a candidate block 64 and hashing that representative sub-block 66 to form a digest 69. The techniques then involve searching a deduplication database 54 for a match between the digest 69 computed from representative sub-block 66 and a target digest 74 stored in the database 54. The target digest 74 was previously computed by hashing a target sub-block 82 of a previously-stored target block 80. When a match is found, the techniques may identify a duplicate range 96 shared between the candidate block 64 and the target block 80 and logically effect persistent storage of the duplicate range 96. In some embodiments, this is accomplished by configuring mapping metadata 90 of the candidate block 64 so that it points to the duplicate range 96 in the target block 80.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of performing deduplication, the method comprising:
   selecting, by applying a deterministic selection criterion, a sub-block of a block of data that contains multiple sub-blocks;
   performing a lookup, into a deduplication table, of a digest generated by hashing the selected sub-block, the lookup matching an entry indexed by the digest in the deduplication table, the entry identifying a previously processed block;
   effecting storage of the block, including pointing to the previously processed block; and
   for another block of data that also contains multiple sub-blocks:
      selecting, by applying the deterministic selection criterion, another sub-block of the other block of data;
      performing another lookup, into the deduplication table, of another digest generated by hashing the other selected sub-block;
      failing to find any entry indexed by the other digest in the deduplication table, and, in response, looking up, in the deduplication table, a block digest generated by hashing the other block in its entirety; and
      failing to find any entry indexed by the block digest in the deduplication table, and, in response:
         writing contents of the other block to persistent storage; and
         inserting another entry, indexed by the other digest, into the deduplication table, the other entry identifying the other block as having been processed.

2. The method of claim 1,
   wherein the method further comprises identifying a target range of the previously processed block whose contents match a corresponding range of the block of data; and
   wherein pointing to the previously processed block includes storing metadata in connection with the block that associates the identified target range as being part of the block of data.

3. The method of claim 2 wherein the previously processed block also includes a unique range that does not match contents of the block of data.

4. The method of claim 3,
   wherein the entry further identifies a first offset within the previously processed block, the first offset providing a location of contents within the previously processed block that are shared with the selected sub-block;
   wherein the selected sub-block is located at a second offset within the block of data; and
   wherein identifying the target range includes comparing the second offset with the first offset, and determining that the second offset differs from the first offset.

5. The method of claim 3, wherein identifying the target range includes:
   generating a first block digest by hashing the block in its entirety;
   comparing the first block digest with a previously-stored second block digest that was generated by hashing the previously processed block in its entirety, and determining that the first block digest differs from the second block digest.

6. The method of claim 3,
   wherein the entry further identifies a first offset within the previously processed block, the first offset providing a location of a prime sub-block within the previously processed block whose contents are shared with the selected sub-block;
   wherein the selected sub-block is located at a second offset within the block of data; and
   wherein identifying the target range includes:
      identifying the prime sub-block as part of the target range; and
      comparing a first adjacent sub-block of the previously processed block having an offset adjacent to the first offset with a second adjacent sub-block of the block of data having an offset adjacent to the second offset to identify whether the first adjacent sub-block is also part of the target range.

7. The method of claim 6,
   wherein identifying the target range further includes:
      working outwards from the prime sub-block, comparing additional sub-blocks of the previously processed block to corresponding sub-blocks of the block of data until comparison fails; and
      identifying each additional sub-block of the previously processed block for which comparison to a corresponding sub-block of the block of data succeeded as part of the target range; and
   wherein effecting storage of the block further includes writing contents of the block of data that are not also included within the identified target range to persistent storage.

8. The method of claim 6,
   wherein identifying the target range further includes:
      successfully comparing additional sub-blocks of the previously processed block up to an end of the previously processed block with corresponding sub-blocks of the block of data; and
      identifying each additional sub-block of the previously processed block for which comparison to a corresponding sub-block of the block of data succeeded as part of the target range;
   wherein the method further includes:
      identifying an adjacent previously processed block located adjacent to the previously processed block within a logical address space;
      comparing additional sub-blocks of the adjacent previously processed block with corresponding sub-blocks of the block of data; and
      identifying each additional sub-block of the adjacent previously processed block for which comparison to a corresponding sub-block of the block of data succeeded as part of another target range whose contents are included within the block of data; and
   wherein pointing to the previously processed block further includes storing metadata in connection with the block that associates the identified other target range as being part of the block of data.

9. The method of claim 8,
   wherein all sub-blocks of the block of data compare successfully to corresponding sub-blocks of the previously processed block and the adjacent previously processed block; and
   wherein effecting storage of the block further includes not writing any portion of the block to persistent storage.

10. The method of claim 3 wherein the method further comprises:
    generating another block digest by hashing the block in its entirety; and inserting another entry, indexed by the other block digest, into the deduplication table, the other entry identifying the block as having been processed.

11. The method of claim 2 wherein contents of the block of data in its entirety are identical to the contents of the identified target range.

12. The method of claim 11, wherein identifying the target range includes:
generating a first block digest by hashing the block in its entirety; and
comparing the first block digest to a previously-stored second block digest that was generated by hashing the previously processed block in its entirety, and in response, determining that the first block digest equals the second block digest.

13. The method of claim 1, wherein selecting includes:
calculating an entropy of each of the multiple sub-blocks of the block; and
selecting a sub-block from the multiple sub-blocks having a highest calculated entropy as the selected sub-block.

14. The method of claim 13 wherein the method further comprises, for yet another block of data that also contains multiple sub-blocks:
calculating an entropy of each of the multiple sub-blocks of the yet other block;
selecting another sub-block from the multiple sub-blocks of the yet other block having a highest calculated entropy as a candidate sub-block;
comparing the highest calculated entropy of the candidate sub-block to a predetermined threshold value, yielding a threshold result; and
in response to the comparison yielding, as its threshold result, a determination that the highest calculated entropy of the candidate sub-block is less than the predetermined threshold value, looking up, in the deduplication table, yet another digest generated by hashing the yet other block in its entirety.

15. The method of claim 14 wherein the method further comprises, in response to looking up, in the deduplication table, the yet other digest generated by hashing the yet other block in its entirety:
failing to find any entry indexed by the yet other digest in the deduplication table;
writing contents of the yet other block to persistent storage; and
inserting yet another entry indexed by the yet other digest into the deduplication table, the yet other entry identifying the yet other block as having been processed.

16. The method of claim 14 wherein the method further comprises, in response to looking up, in the deduplication table, the yet other digest generated by hashing the yet other block in its entirety:
finding yet another entry indexed by the yet other digest in the deduplication table, the yet other entry identifying another previously processed block; and
effecting storage of the yet other block by pointing to the previously processed block and not writing any portion of the yet other block to persistent storage.

17. An apparatus comprising processing circuitry coupled to memory configured to:
select, by applying a deterministic selection criterion, a sub-block of a block of data that contains multiple sub-blocks, wherein selecting includes:
calculating an entropy of each of the multiple sub-blocks of the block; and
selecting a sub-block from the multiple sub-blocks having a highest calculated entropy as the selected sub-block;
perform a lookup, into a deduplication table, of a digest generated by hashing the selected sub-block, the lookup matching an entry indexed by the digest in the deduplication table, the entry identifying a previously processed block; and
effect storage of the block, including pointing to the previously processed block; and
for another block of data that also contains multiple sub-blocks:
selecting, by applying the deterministic selection criterion, another sub-block of the other block of data;
performing another lookup, into the deduplication table, of another digest generated by hashing the other selected sub-block;
failing to find any entry indexed by the other digest in the deduplication table, and, in response, looking up, in the deduplication table, a block digest generated by hashing the other block in its entirety; and
failing to find any entry indexed by the block digest in the deduplication table, and, in response:
writing contents of the other block to persistent storage; and
inserting another entry, indexed by the other digest, into the deduplication table, the other entry identifying the other block as having been processed.

18. A computer program product comprising a non-transitory computer-readable storage medium storing a set of instructions, which, when executed by a computing device cause the computing device to perform deduplication by:
selecting, by applying a deterministic selection criterion, a sub-block of a block of data that contains multiple sub-blocks;
performing a lookup, into a deduplication table, of a digest generated by hashing the selected sub-block, the lookup matching an entry indexed by the digest in the deduplication table, the entry identifying a previously processed block; and
effecting storage of the block, including pointing to the previously processed block; and
for another block of data that also contains multiple sub-blocks:
selecting, by applying the deterministic selection criterion, another sub-block of the other block of data;
performing another lookup, into the deduplication table, of another digest generated by hashing the other selected sub-block;
failing to find any entry indexed by the other digest in the deduplication table, and, in response, looking up, in the deduplication table, a block digest generated by hashing the other block in its entirety; and
failing to find any entry indexed by the block digest in the deduplication table, and, in response:
writing contents of the other block to persistent storage; and
inserting another entry, indexed by the other digest, into the deduplication table, the other entry identifying the other block as having been processed.

* * * * *